(12) United States Patent
Russell et al.

(10) Patent No.: US 12,705,275 B2
(45) Date of Patent: Aug. 11, 2026

(54) NATURAL LANGUAGE-GUIDED MUSIC AUDIO RECOMMENDATION FOR VIDEO USING MACHINE LEARNING

(71) Applicant: Adobe Inc., San Jose, CA (US)

(72) Inventors: Bryan Russell, San Francisco, CA (US); Justin Salamon, San Francisco, CA (US); Daniel McKee, Urbana-Champaign, IL (US); Josef Sivic, Prague (CZ)

(73) Assignee: Adobe Inc., San Jose, CA (US)

( * ) Notice: Subject to any disclaimer, the term of this patent is extended or adjusted under 35 U.S.C. 154(b) by 164 days.

(21) Appl. No.: 18/319,202

(22) Filed: May 17, 2023

(65) Prior Publication Data

US 2024/0386048 A1 Nov. 21, 2024

(51) Int. Cl.
*G06F 16/432* (2019.01)
*G06F 16/438* (2019.01)
*G06F 16/632* (2019.01)
*G06F 16/68* (2019.01)

(52) U.S. Cl.
CPC ........ *G06F 16/4393* (2019.01); *G06F 16/434* (2019.01); *G06F 16/632* (2019.01); *G06F 16/686* (2019.01)

(58) Field of Classification Search
None
See application file for complete search history.

(56) References Cited

U.S. PATENT DOCUMENTS 10,276,189 B1 * 4/2019 Brochu .................. G11B 27/00
12,216,709 B1 * 2/2025 Xie ...................... H04N 21/232
2019/0278978 A1 * 9/2019 Park .................... G06F 16/7834
(Continued)

OTHER PUBLICATIONS

Akbari, H., et al., "VATT: Transformers for Multimodal Self-Supervised Learning from Raw Video, Audio and Text," Advances in Neural Information Processing Systems, 34, 2021, pp. 24206-24221.

(Continued)

*Primary Examiner* — Christopher J Fibbi
(74) *Attorney, Agent, or Firm* — Nicholson De Vos Webster & Elliott LLP

(57) ABSTRACT

Embodiments are disclosed for an audio recommendation system trained to recommend music audio sequences for pairing with query video sequences using neural networks. In particular, in one or more embodiments, the disclosed systems and methods comprise receiving an input including a query video sequence and natural language text. The disclosed systems and methods further comprise generating a fused visual-text embedding based on a visual embedding and a text embedding corresponding to the input. The disclosed systems and methods further comprise comparing audio embeddings for music audio sequences of a music audio sequences database with the fused visual-text embedding. The disclosed systems and methods further comprise determining a music audio sequence from the music audio sequences database as the recommended music audio sequence for pairing with the query video sequence based on a similarity metric calculated between an audio embedding for the music audio sequence and the fused visual-text embedding.

9 Claims, 11 Drawing Sheets

(56) References Cited

U.S. PATENT DOCUMENTS

| | | | | |
|---|---|---|---|---|
| 2020/0394213 | A1* | 12/2020 | Li | G06V 20/41 |
| 2021/0357445 | A1* | 11/2021 | Aguirre-Suarez | G06F 16/48 |
| 2022/0147558 | A1* | 5/2022 | Steffensen | G11B 27/28 |
| 2023/0118966 | A1* | 4/2023 | Liu | G06F 40/30 345/473 |
| 2023/0186953 | A1* | 6/2023 | Rein | G06F 16/48 386/241 |
| 2024/0045904 | A1* | 2/2024 | Tiwari | G11B 27/036 |
| 2024/0290081 | A1* | 8/2024 | Yu | G06F 40/284 |

OTHER PUBLICATIONS

Suris, D., et al., "It's Time for Artistic Correspondence in Music and Video," 2022 IEEE/CVF Conference on Computer Vision and Pattern Recognition (CVPR), Jun. 2022, pp. 10554-10564.

* cited by examiner

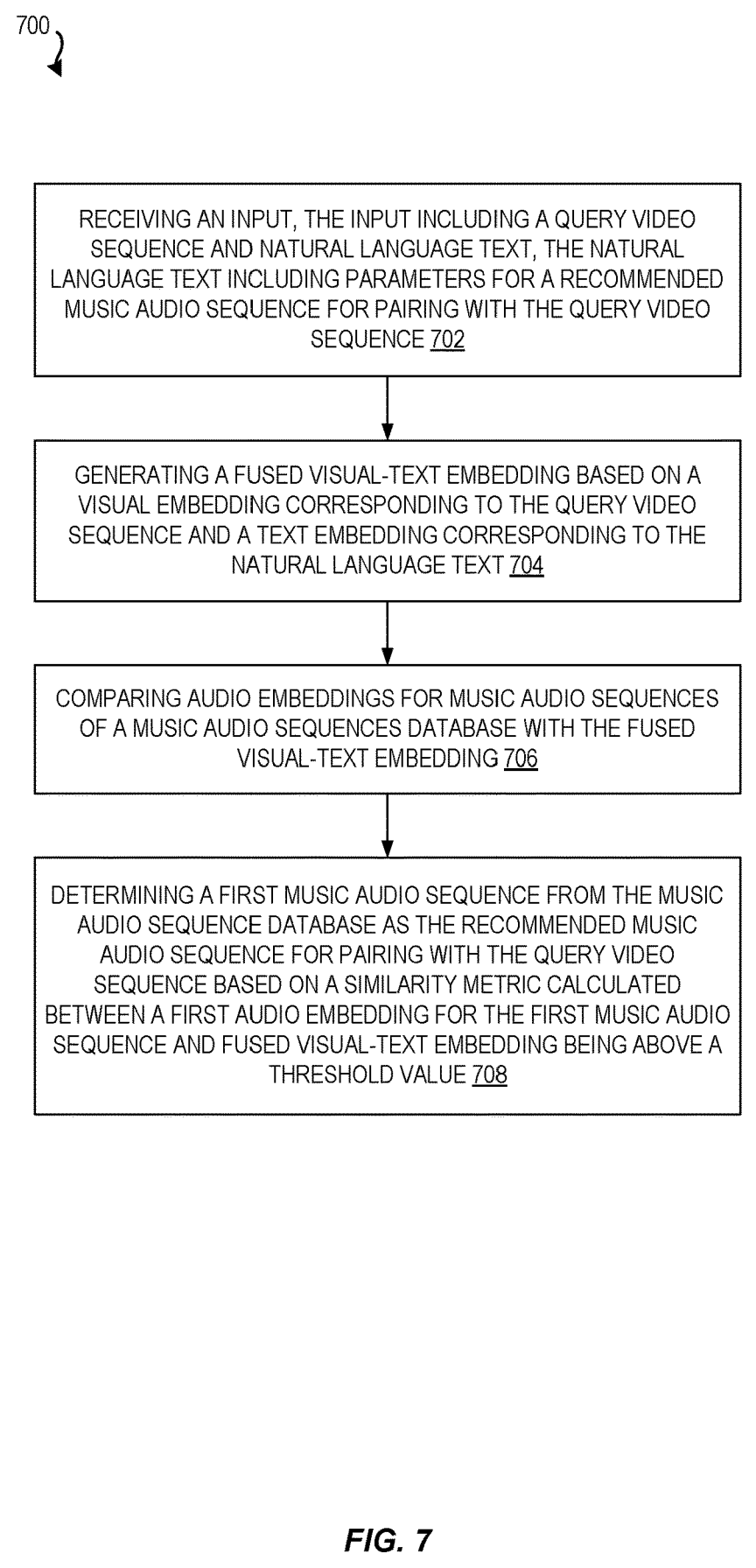

700

RECEIVING AN INPUT, THE INPUT INCLUDING A QUERY VIDEO SEQUENCE AND NATURAL LANGUAGE TEXT, THE NATURAL LANGUAGE TEXT INCLUDING PARAMETERS FOR A RECOMMENDED MUSIC AUDIO SEQUENCE FOR PAIRING WITH THE QUERY VIDEO SEQUENCE 702

GENERATING A FUSED VISUAL-TEXT EMBEDDING BASED ON A VISUAL EMBEDDING CORRESPONDING TO THE QUERY VIDEO SEQUENCE AND A TEXT EMBEDDING CORRESPONDING TO THE NATURAL LANGUAGE TEXT 704

COMPARING AUDIO EMBEDDINGS FOR MUSIC AUDIO SEQUENCES OF A MUSIC AUDIO SEQUENCES DATABASE WITH THE FUSED VISUAL-TEXT EMBEDDING 706

DETERMINING A FIRST MUSIC AUDIO SEQUENCE FROM THE MUSIC AUDIO SEQUENCE DATABASE AS THE RECOMMENDED MUSIC AUDIO SEQUENCE FOR PAIRING WITH THE QUERY VIDEO SEQUENCE BASED ON A SIMILARITY METRIC CALCULATED BETWEEN A FIRST AUDIO EMBEDDING FOR THE FIRST MUSIC AUDIO SEQUENCE AND FUSED VISUAL-TEXT EMBEDDING BEING ABOVE A THRESHOLD VALUE 708

*FIG. 7*

800 

RECEIVING A TRAINING INPUT, THE TRAINING INPUT INCLUDING A TRAINING MEDIA SEQUENCE AND TRAINING NATURAL LANGUAGE TEXT, WHEREIN THE TRAINING MEDIA SEQUENCE IS A PAIRING OF A TRAINING MUSIC AUDIO SEQUENCE AND A TRAINING VIDEO SEQUENCE, AND WHEREIN THE TRAINING NATURAL LANGUAGE TEXT DESCRIBES THE TRAINING MUSIC AUDIO SEQUENCE 802

↓

GENERATING, BY AN EMBEDDING FUSION MODULE, A TRAINING FUSED VISUAL-TEXT EMBEDDING BASED ON A TRAINING VISUAL EMBEDDING CORRESPONDING TO THE TRAINING VIDEO SEQUENCE AND A TRAINING TEXT EMBEDDING CORRESPONDING TO THE TRAINING NATURAL LANGUAGE TEXT 804

↓

GENERATING A TRAINING AUDIO EMBEDDING FOR THE TRAINING MUSIC AUDIO SEQUENCE 806

↓

TRAINING THE EMBEDDING FUSION MODULE BASED ON CALCULATING A LOSS USING THE TRAINING FUSED VISUAL-TEXT EMBEDDING AND THE TRAINING AUDIO EMBEDDING 808

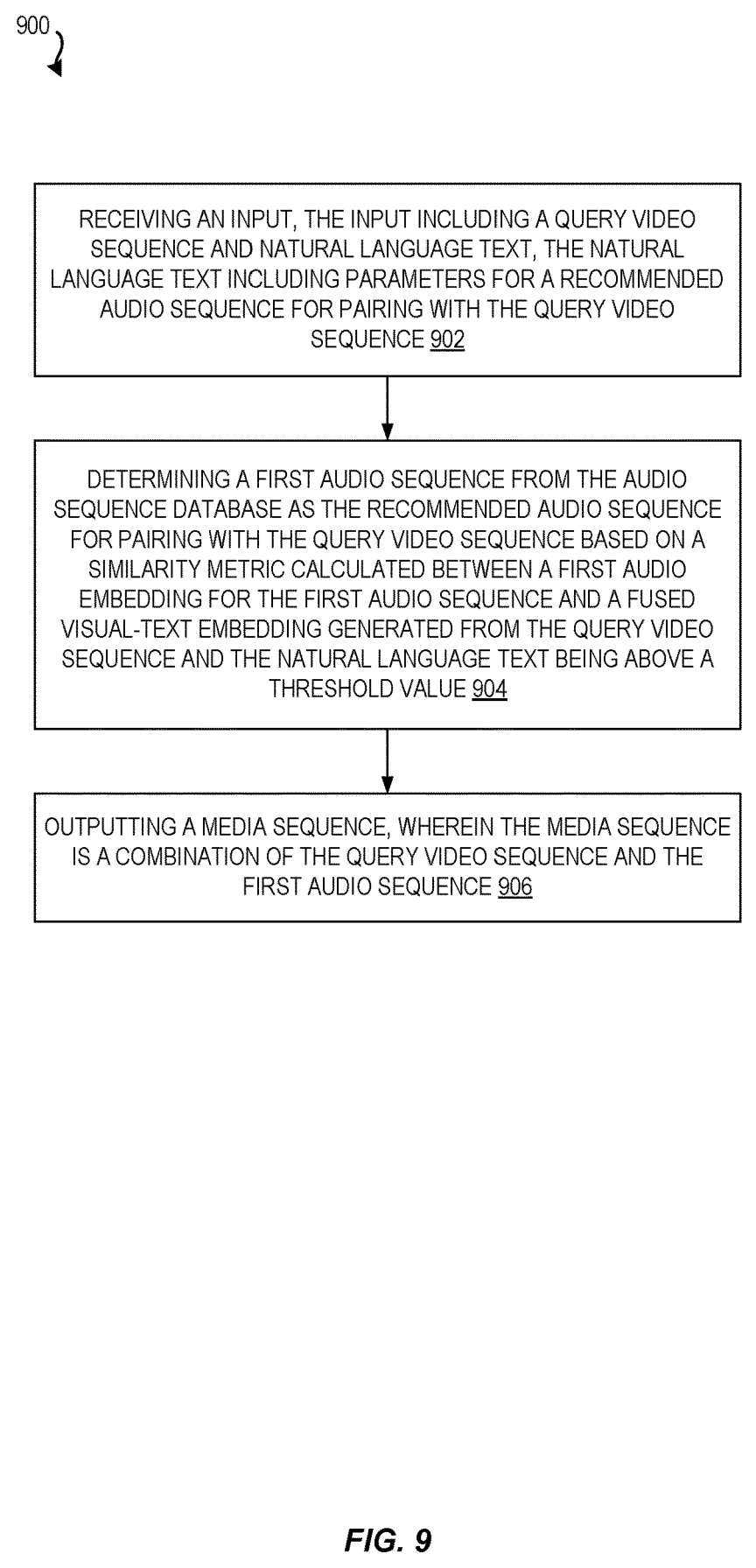

RECEIVING AN INPUT, THE INPUT INCLUDING A QUERY VIDEO SEQUENCE AND NATURAL LANGUAGE TEXT, THE NATURAL LANGUAGE TEXT INCLUDING PARAMETERS FOR A RECOMMENDED AUDIO SEQUENCE FOR PAIRING WITH THE QUERY VIDEO SEQUENCE 902

DETERMINING A FIRST AUDIO SEQUENCE FROM THE AUDIO SEQUENCE DATABASE AS THE RECOMMENDED AUDIO SEQUENCE FOR PAIRING WITH THE QUERY VIDEO SEQUENCE BASED ON A SIMILARITY METRIC CALCULATED BETWEEN A FIRST AUDIO EMBEDDING FOR THE FIRST AUDIO SEQUENCE AND A FUSED VISUAL-TEXT EMBEDDING GENERATED FROM THE QUERY VIDEO SEQUENCE AND THE NATURAL LANGUAGE TEXT BEING ABOVE A THRESHOLD VALUE 904

OUTPUTTING A MEDIA SEQUENCE, WHEREIN THE MEDIA SEQUENCE IS A COMBINATION OF THE QUERY VIDEO SEQUENCE AND THE FIRST AUDIO SEQUENCE 906

*FIG. 9*

NATURAL LANGUAGE-GUIDED MUSIC AUDIO RECOMMENDATION FOR VIDEO USING MACHINE LEARNING

BACKGROUND

A key part of media creation, and the video editing process in particular, is choosing a musical soundtrack to artistically pair with video content. Music can convey critical information about how a video should be perceived. Music selection alone can transform a visual scene into one that is perceived as happy, scary, or sad. Thus, determining the music or audio to use can be vital to setting the mood or emotional impact of the video. Given the increasing popularity of short-form videos on social media platforms, automated music recommendation systems have become an increasingly common and important part of video editing applications.

SUMMARY

Introduced here are techniques/technologies that allow an audio recommendation system to recommend music audio sequences that best match a query video sequence and music parameters defined by natural language text input. The system identifies the music audio sequences by correlating audio embeddings for music audio sequences with a fused visual-text embedding generated from a visual embedding for the query video sequence and a natural language text embedding for the natural language text input.

In particular, in one or more embodiments, an audio recommendation system receives an input from a user that includes a query video sequence and natural language text describing parameters. The parameters can be provided by a user to guide the audio recommendation system in generating a music audio sequence recommendation. For example, the parameters can indicate genre (e.g., rock, pop, country, etc.), mood (e.g., happy, nostalgic, relaxing, etc.), and instrumentation (e.g., guitar, drum set, female/male vocals, etc.). The audio recommendation system uses encoders and transformers to generate a visual embedding and a text embedding for the query video sequence and natural language text, respectively. The visual embedding and text embedding are then fused into a single fused visual-text embedding and compared with audio embeddings from a music audio sequences database to determine at least one music audio sequence to provide as the music audio sequence recommendation for the query video sequence.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates a flowchart of a series of acts in a method of generating a music audio sequence recommendation for pairing with a query video sequence based on the query video sequence and natural language text inputs using a trained audio recommendation system in accordance with one or more embodiments;

FIG. 8 illustrates a flowchart of a series of acts in a method of training neural network models of an audio recommendation system to generate music audio sequence recommendations using an input video sequence and a natural language text input in accordance with one or more embodiments;

FIG. 9 illustrates a flowchart of a series of acts in a method of generating a music audio sequence recommendation for pairing with a query video sequence based on the query video sequence and natural language text inputs using a trained audio recommendation system in accordance with one or more embodiments;

DETAILED DESCRIPTION

One or more embodiments of the present disclosure include an audio recommendation system that trains transformers to identify music audio sequence recommendations for pairing with video sequences using both the content of the video sequence and natural language text inputs. The natural language text inputs can include user-specified descriptions of genre, mood, and instrumentation that can guide the recommendation generated by the audio recommendation system.

Some existing solutions have introduced neural networks into their music recommendation systems. While these systems can be helpful for finding relevant music, users are limited to what the systems recommend based on the video content. While a user can sort through recommendations to find a satisfactory audio sequence, these systems do not provide users with any control over the types of music recommended. These solutions thus have limitations, as music recommendation are retrieved based solely on the visual content and style of a video.

Other existing solutions have investigated how to combine audio and video with text representations. For example, a VATT model is capable of using a single shared transformer backbone across modalities. However, the VATT model is incapable of using two modalities in combination. Further, these solutions focus on “environmental” or “everyday" sounds rather than music, and, as a result, they lack the long-range temporal context modeling critical for music recommendation.

Existing audio recommendation for video solutions produce inadequate or insufficient results. To address these and other issues, embodiments train neural networks used in an audio recommendation system to generate audio recommendations based on an input video sequence and user guidance indicating specific musical attributes including mood, genre, and/or instrumentation. To maximize flexibility and user convenience, embodiments of the audio recommendation system can receive and process user musical attribute descriptions in the form of free-form natural language text inputs. Embodiments further include the generation of a music video dataset of automatically generated natural language descriptions for music videos. Such embodiments include combining a pre-trained music tagger with a large-scale language model to output natural language descriptions for any music clip. By training the audio recommendation system with the music video dataset, the audio recommendation system can retrieve music that matches both the visual content/style of an input video and described musical genre, mood, and instrumentation in the natural language query.

Figure 1:
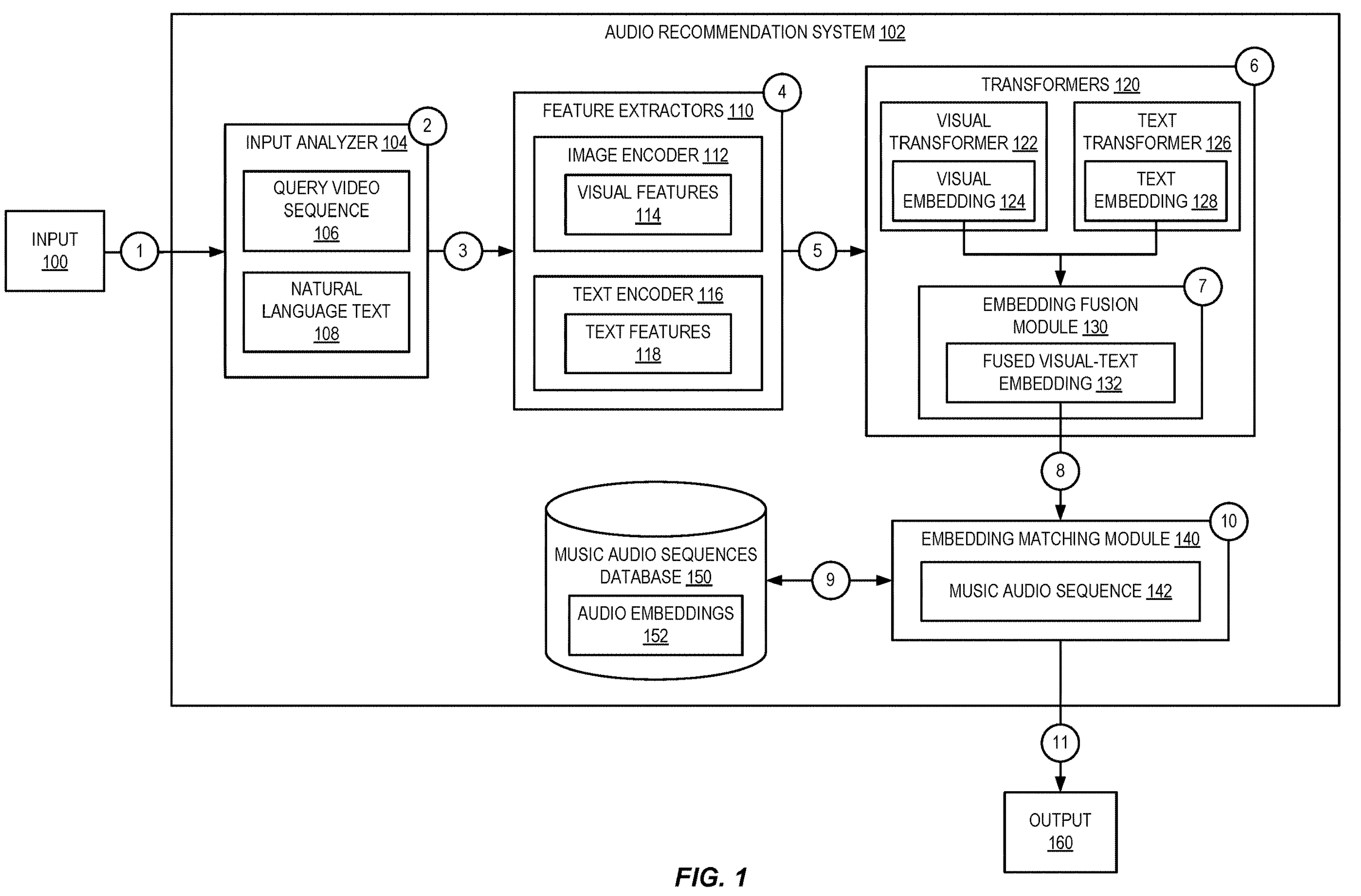
FIG. 1 illustrates a diagram of a process of generating a music audio sequence recommendation based on an input video and natural language text using machine learning models in accordance with one or more embodiments.
Figure 2:
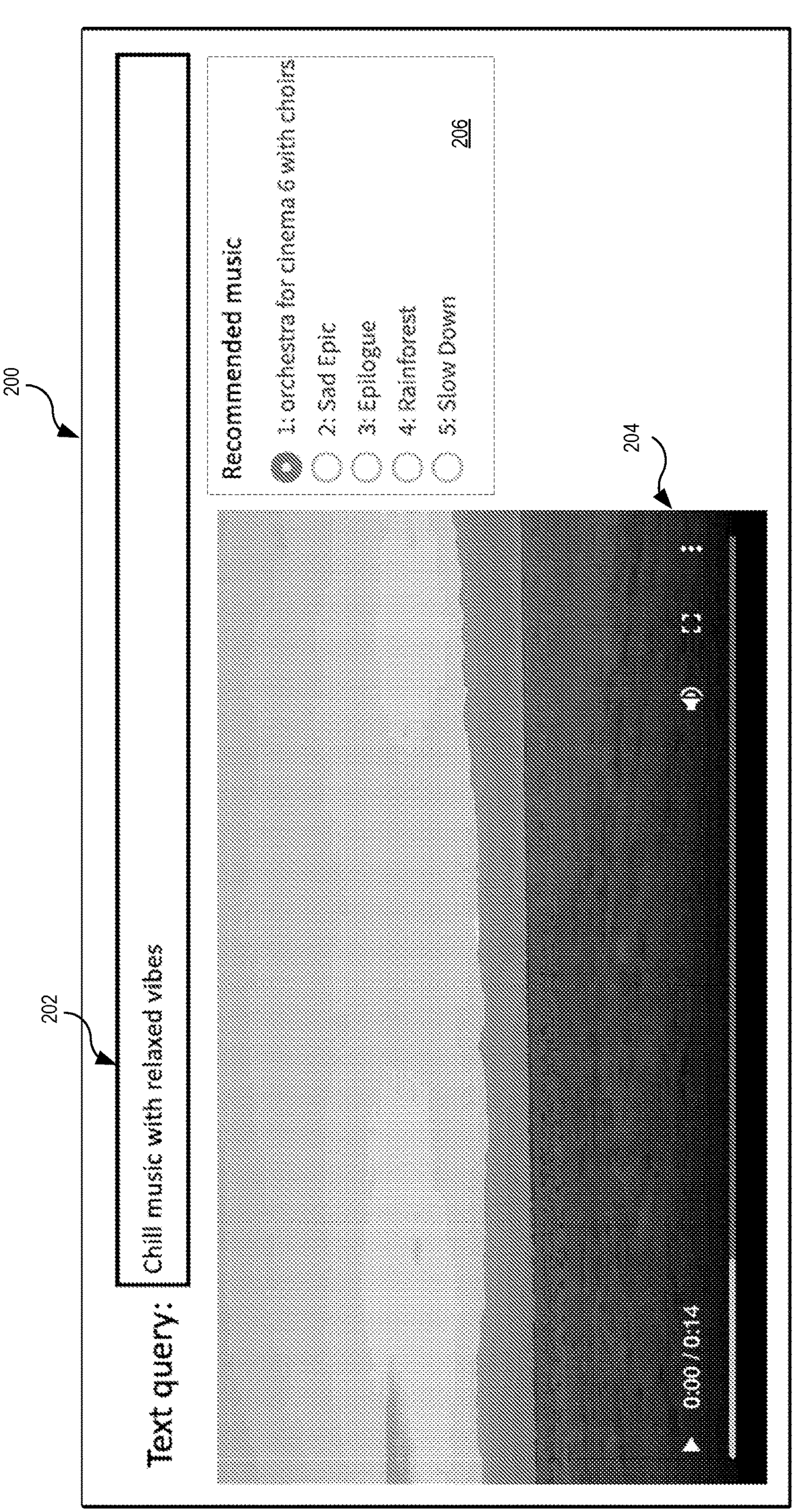
FIG. 2 illustrates an example graphical user interface for an audio recommendation system in accordance with one or more embodiments.

FIG. 1 illustrates a diagram of a process of generating a music audio sequence recommendation based on an input video and natural language text using machine learning models in accordance with one or more embodiments. As shown in FIG. 1, an audio recommendation system 102 receives an input 100, as shown at numeral 1. For example, the audio recommendation system 102 receives the input 100 from a user via a computing device or from a memory or storage location. In one or more embodiments, the input 100 includes at least a query video sequence (e.g., query video sequence 106) and a natural language text input (e.g., natural language text 108). The input 100 can include multiple query video sequences and natural language text inputs that can be fed to the audio recommendation system 102 in parallel or in series. In one or more embodiments, the input 100 can be provided in a graphical user interface (GUI). FIG. 2 illustrates an example graphical user interface for an audio recommendation system in accordance with one or more embodiments. The GUI 200 includes a text box 202 for receiving a natural language text input. The GUI 200 can also include text box to allow a user to provide a query video sequence. For example, the text box can be used to enter a storage location (e.g., on a computing device) or a URL to a location storing the query video sequence. After being provided to the audio recommendation system, the query video sequence can be displayed in a media viewer portion 204 of the GUI 200.

Returning to FIG. 1, the audio recommendation system 102 includes an input analyzer 104 that receives the input 100. In some embodiments, the input analyzer 104 analyzes the input 100, as shown at numeral 2. In some embodiments, the input analyzer 104 analyzes the input 100 to identify query video sequence 106 and natural language text 108. The query video sequence 106 is a video sequence for which a user is requesting a recommendation for an audio sequence (e.g., a music audio sequence) for pairing. The natural language text 108 can be an input indicating parameters for guiding the recommendation to be generated by the audio recommendation system 102. In one or more embodiments, the parameters in the natural language text 108 can indicate a genre, a mood, and/or instrumentation of music. Example genre parameters can include rock, pop, country, dance, electronic, etc. Example mood parameters can include happy, nostalgic, relaxing, dynamic, dramatic, etc. Example instrumentation parameters can include electric guitar, bass guitar, acoustic guitar, piano, synthesizer keyboard, drum set, female/male vocals, etc. Example natural language text 108 are "folk music with guitar" and "upbeat pop."

In some embodiments, the user can also provide an input (e.g., via a dial or slider) that indicates a weighting to apply to the query video sequence 106 and the natural language text 108. For example, the user can designate that a greater weight should be given to the visual embedding 124 for the query video sequence 106 over the text embedding 128 generated for the natural language text 108.

After the input analyzer 104 analyzes the input 100 to identify the query video sequence 106 and the natural language text 108, the query video sequence 106 and the natural language text 108 are sent to feature extractors 110, as shown at numeral 3. In one or more embodiments, the feature extractors 110 include an image encoder 112 and a text encoder 116. The image encoder 112 and the text encoder 116 can be configured to extract strong modality-specific base features from the query video sequence 106 and the natural language text 108, respectively, at numeral 4. In one embodiment, the image encoder 112 extracts visual features 114 for each frame, or segment, of the query video sequence 106, where each frame of the query video sequence 106 is represented by separate feature vectors. For example, given query video sequence 106, v, and image encoder 112, $g^v$, visual features 114, $x^v=g^v(v)$, are generated. In one embodiment, the text encoder 116 extracts a single set of text features 118 from the natural language text 108. For example, given natural language text 108, t, and text encoder 116, $g^t$, text features 118, $x^t=g^t(t)$, is generated. In one or more embodiments, the image encoder 112 and the text encoder 116 use the CLIP supervision model. The visual features 114 and the text features 118 can be feature vectors that are n-dimensional vectors of numerical features that represent the query video sequence 106 and the natural language text 108, respectively. In one or more embodiments, the visual features 114 and the text features 118 are encoded into embeddings of size d=256 using a linear projection layer for each modality. After the feature extractors 110 generate the visual features 114 and the text features 118, the visual features 114 and the text features 118 are sent to transformers 120, as shown at numeral 5.

In one or more embodiments, the transformers 120 include transformer encoder neural networks, including a visual transformer 122, a text transformer 126, and an embedding fusion module 130. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the visual transformer 122 generates a visual embedding 124 and text transformer 126 generates a text embedding 128, at numeral 6. In one or more embodiments, the visual transformer 122, $f^v$, generates the visual embedding 124, $y^v=f^v(x^v)$, for the query video sequence 106 based on the visual features 114, $x^v=g^v(v)$. In one or more embodiments, the visual embedding 124 is a single embedding generated from the base visual features 114 for a plurality of frames, or segments, of the query video sequence 106. In one or more embodiments, the text transformer 126, $f^t$, generates the text embedding 128, $y^t=f^t(x^t)$, for the natural language text 108 based on the text features 118, $x^t=g^t(t)$. In one or more embodiments, the visual embedding 124 and text embedding 128 are encoded into embeddings of size d=256.

The visual embedding 124 and the text embedding 128 are then passed to the embedding fusion module 130 to generate a single fused visual-text embedding 132 representing the natural language text and query video sequence, at numeral 7. In some embodiments, the embedding fusion module 130 is a two-layer transformer model that takes in the visual embedding 124 and text embedding 128 as inputs. Through training, the two-layer transformer learns how best to combine the inputs to produce a resulting single fused visual-text embedding 132 that is best for retrieving a corresponding music audio embedding. In one or more embodiments, the embedding fusion module 130, $f^{vt}$, generates the single fused visual-text embedding 132, $y^{vt}=f^{vt}(y^v, y^t)$, by fusing the visual embedding 124 and the text embedding 128 into a single embedding space. In some embodiments, the embedding fusion module 130 concatenates the visual embedding 124 and the text embedding 128 and feeds the concatenated embeddings into a transformer (e.g., similar to text transformer 126) to generate the fused visual-text embedding 132. In other embodiments, the embedding fusion module 130 can be implemented as a single linear layer or a series of linear layers. In another embodiment, fused visual-text embedding 132 is generated by direct addition of the visual embedding 124 and the text embedding 128. In one or more embodiments, the fused visual-text embedding 132 is encoded into embeddings of size d=256. After the embedding fusion module 130 generates the fused visual-text embedding 132, the fused visual-text embedding 132 are sent to an embedding matching module 140, as shown at numeral 8.

In one or more embodiments, the embedding matching module 140 can access a music audio sequences database 150 to retrieve music audio sequences, as shown at numeral 9. In one or more embodiments, the music audio sequences in the music audio sequences database 150 have been pre-processed through an audio encoder 304 and an audio transformer 308, as described further in FIG. 3, in a process similar to the process described for the query video sequence, to generate audio embeddings for each of the music audio sequences. In such embodiments, retrieving the music audio sequences from the music audio sequences database 150 includes retrieving associated audio embeddings 152.

Using the fused visual-text embedding 132 and the audio embeddings 152 corresponding to music audio sequences from the music audio sequences database 150, the embedding matching module 140 identifies or determines a music audio sequence 142 whose corresponding audio embedding best matches the fused visual-text embedding 132, as shown at numeral 10. The embedding matching module 140 can determine the music audio sequence 142 by comparing the fused visual-text embedding 132 to the audio embeddings 152 from the music audio sequences database 150. In one or more embodiments, the embedding matching module 140 can identify multiple music audio sequences. In such embodiments, the embedding matching module 140 can rank the music audio sequences based on similarity values or metrics. The music audio sequence 142 can be the highest ranking music audio sequence from the ranking or the top x music audio sequences from the ranking.

After the embedding matching module 140 generates the music audio sequence 142, the music audio sequence 142 can be sent as an output 160, as shown at numeral 11. In some embodiments, the output 160 can include one or more music audio sequences 142. In one or more embodiments, after the process described above in numerals 1-10, the output 160 is sent through a communications channel to the user device or computing device that provided the input requesting the music audio sequence recommendation, to another computing device associated with the user or another user, or to another system or application. In some embodiments, a media sequence is generated by syncing the music audio sequence 142 with the query video sequence 106. As shown in FIG. 2, the output 160 can be displayed in a recommended music portion 206 of the GUI 200. Where the output 160 includes multiple music audio sequence recommendations, the recommended music portion 206 can display a description of each of the multiple music audio sequence recommendations. As depicted in FIG. 2, the recommended music portion 206 includes an interface element (e.g., radio buttons) that allow a user to select between the multiple music audio sequence recommendations for performance with the query video sequence in the media viewer portion 204 of the GUI 200.

Figure 3:
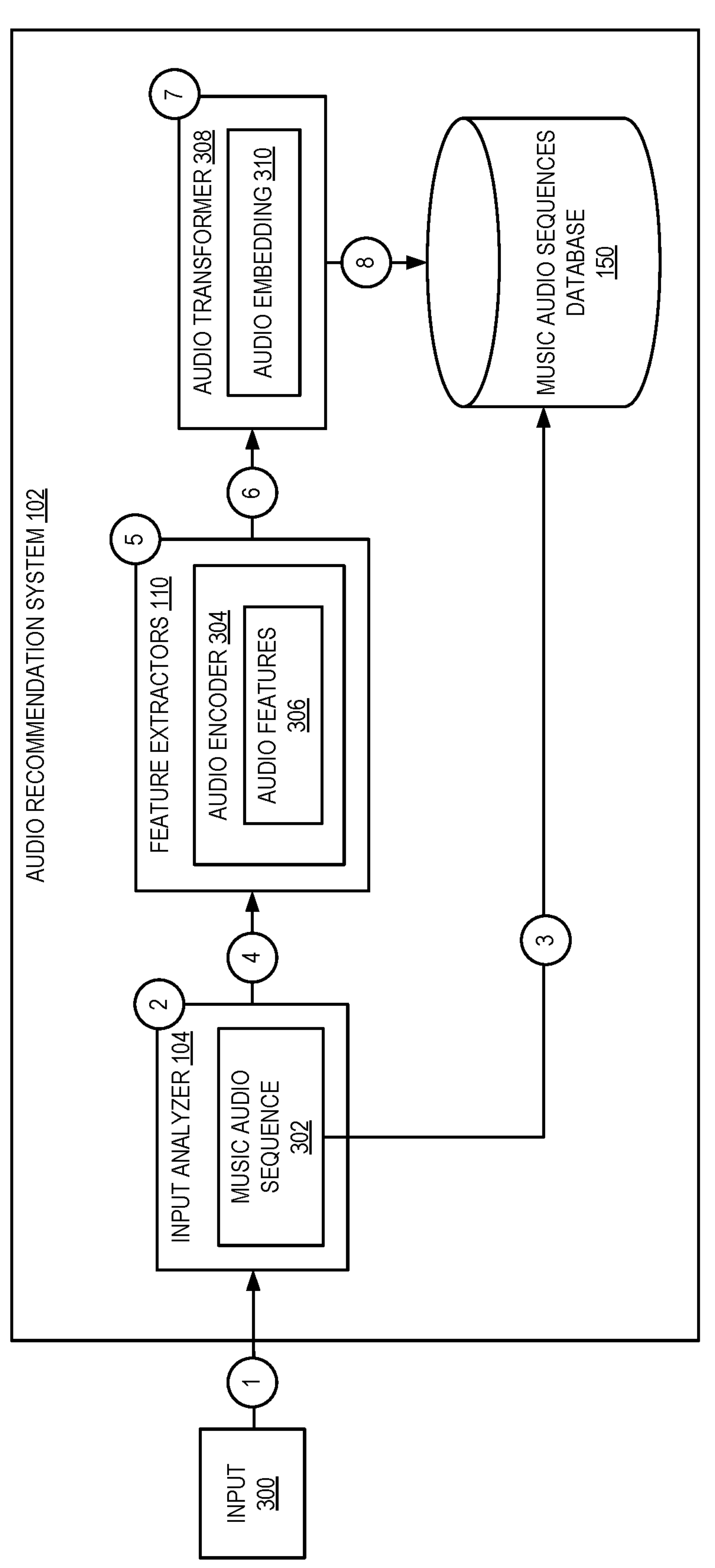
FIG. 3 illustrates a diagram of a process of generating audio embeddings for music audio sequences in a music audio sequences database using machine learning models in accordance with one or more embodiments.

FIG. 3 illustrates a diagram of a process of generating audio embeddings for music audio sequences in a music audio sequences database using machine learning models in accordance with one or more embodiments. As shown in FIG. 3, an audio recommendation system 102 receives an input 300, as shown at numeral 1. For example, the audio recommendation system 102 receives the input 300 from a user via a computing device or from a memory or storage location. In one or more embodiments, the input 300 includes an audio sequence (e.g., music audio sequence 302). The input 100 can include multiple music audio sequences that can be fed to the audio recommendation system 102 in parallel or in series.

As illustrated in FIG. 3, the audio recommendation system 102 includes an input analyzer 104 that receives the input 300. In some embodiments, the input analyzer 104 analyzes the input 300, as shown at numeral 2. In some embodiments, the input analyzer 104 analyzes the input 300 to identify music audio sequence 302. The music audio sequence 302 is a music audio sequence for which a user is requesting an audio embedding representation be generated.

After the input analyzer 104 analyzes the input 300 to identify the music audio sequence 302, the music audio sequence 302 can be sent to a music audio sequences database 150 for storage, as shown at numeral 3. The input analyzer 104 further sends the music audio sequence 302 to feature extractors 110, as shown at numeral 4. In one or more embodiments, the feature extractors 110 include an audio encoder 304. Although not illustrated in FIG. 3, the feature extractors 110 can also include an image encoder 112 and a text encoder 116, as described previously in FIG. 1. The audio encoder 304 can be configured to extract strong modality-specific base features from the music audio sequence 302, at numeral 5. In one embodiment, the audio encoder 304 extracts audio features 306 for each frame, or segment, of the music audio sequence 302, where each frame of the music audio sequence 302 is represented by separate feature vectors. For example, given music audio sequence 302, m, and audio encoder 304, $g^m$, audio features 306, $x^m=g^m(m)$, are generated. In one or more embodiments, the audio encoder 304 uses the DeepSim model. The audio features 306 can be feature vectors that are n-dimensional vectors of numerical features that represent the music audio sequence 302. In one or more embodiments, the audio features 306 are encoded into embeddings of size d=256 using a linear projection layer for each modality. After the audio encoder 304 generates the audio features 306, the audio features are sent to an audio transformer 308, as shown at numeral 6.

In one or more embodiments, the audio transformer 308 is a transformer encoder neural network. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the audio transformer 308 generates an audio embedding 310 using the audio features 306, at numeral 7. In one or more embodiments, the audio transformer 308, $f^m$, generates the audio embedding 310, $y^m=f^m(x^m)$, for the music audio sequence 302 based on the audio features 306, $x^m=g^m(m)$. In one or more embodiments, the audio embedding 310 is a single embedding generated from the base audio features 306 for a plurality of frames, or segments, of the music audio sequence 302.

The audio embedding 310 is then passed to a music audio sequences database 150 for storage with its associated music audio sequence 302, as shown at numeral 8. The steps described above can be repeated for each music audio sequence 302 received in the input 300.

In one or more embodiments, in addition to the input indicating parameters for guiding the recommendation, a user can provide additional inputs indicating a weighting for each of the parameters. For example, the user can provide an input through a text input or using input elements on a GUI (e.g., a dial or slider) to designate a weight to the parameters. For example, the user can designate a weight of 0.4 or 40% to "guitar," 0.25 or 25% to "happy", etc. Given such an input, the audio recommendation system 102 can compute a weighted average of the tags corresponding to "guitar" and "happy" using the user-designated weights, which can then be passed to the text transformer 126. By applying the weights to the text embedding 128, the weights can be used by the audio recommendation system 102 to identify music audio sequences that best match the request.

In some embodiments, the natural language text 108 can include a temporal aspect, where a first set of parameters can be indicated for a first portion of the audio to be recommended by the audio recommendation system 102, a second set of parameters can be indicated for a second portion of the audio to be recommended by the audio recommendation system 102, and so on. For example, a user may request a music audio sequence recommendation for a query video sequence by providing the natural language text: "piano opening and then added drums and guitars." In one embodiment, the user can be prompted to provide such a description as a series of multiple descriptions. For example, the natural language text can be input as ["piano solo", "piano with drums and guitar" ]. The text encoder 116 can then encode the two descriptions as a sequence of base text features 118 of length "2" for input to the text transformer 126.

Figure 4:
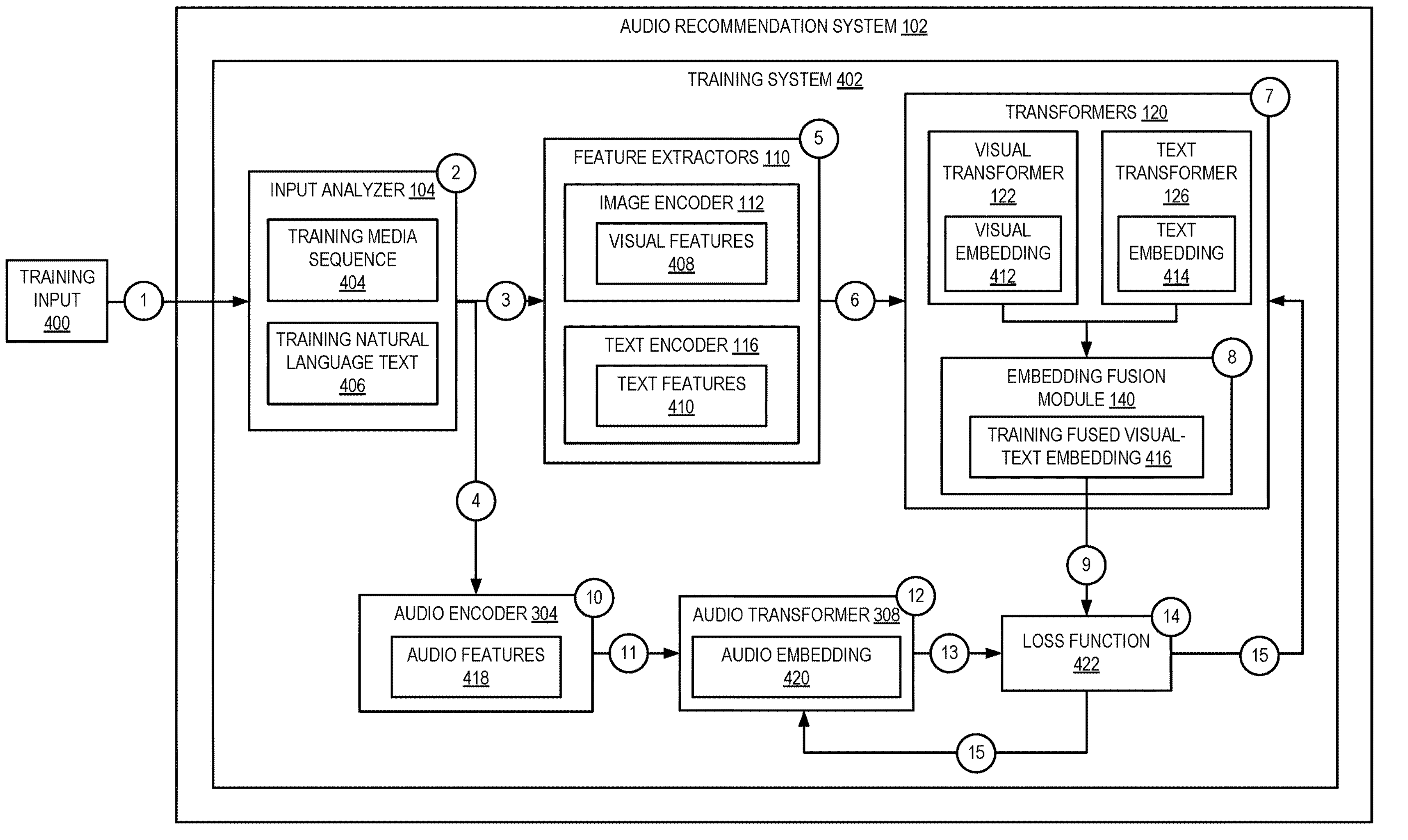
FIG. 4 illustrates a diagram of a process of training machine learning models to generate music audio sequence recommendations based on an input video and natural language text in accordance with one or more embodiments.

FIG. 4 illustrates a diagram of a process of training machine learning models to generate music audio sequence recommendations based on an input video and natural language text in accordance with one or more embodiments. In one or more embodiments, a training system 402 is configured to train neural networks (e.g., audio transformer 308 and embedding fusion module 130) to generate fused visual-text embeddings using visual features and text features based on training inputs. In some embodiments, the training system 402 is a part of an audio recommendation system 102. In other embodiments, the training system 402 can be a standalone system, or part of another system, and deployed to the audio recommendation system 102. For example, the training system 402 may be implemented as a separate system implemented on electronic devices separate from the electronic devices implementing audio recommendation system 102. As shown in FIG. 4, the training system 402 receives a training input 400, as shown at numeral 1. For example, the audio recommendation system 102 receives the training input 400 from a user via a computing device or from a memory or storage location. The audio recommendation system is trained using training triplets of video, audio, and text, corresponding to a video sequence, v, which has been labeled with a generated natural language text description, t, of a music audio sequence track, m. In some embodiments, the video and music audio sequences are artistically paired (e.g., a music video). In one or more embodiments, the training input 400 includes at least a training media sequence (e.g., training media sequence 404) and corresponding training natural language text 406. The training input 400 can include multiple training media sequences and corresponding training natural language text that can be fed to the training system 402 in parallel or in series.

As illustrated in FIG. 4, the audio recommendation system 102 includes an input analyzer 104 that receives the training input 400. In some embodiments, the input analyzer 104 analyzes the training input 400, as shown at numeral 2. In some embodiments, the input analyzer 104 analyzes the training input 400 to identify the training media sequence 404 and training natural language text 406. The training media sequence 404 is an artistically paired music audio sequence and video sequence (e.g., a music video). In one or more embodiments, the input analyzer 104 can extract a music audio sequence and a video sequence from the training media sequence 404. In other embodiments, the training media sequence 404 can include separate audio and video sequences.

Figure 5:
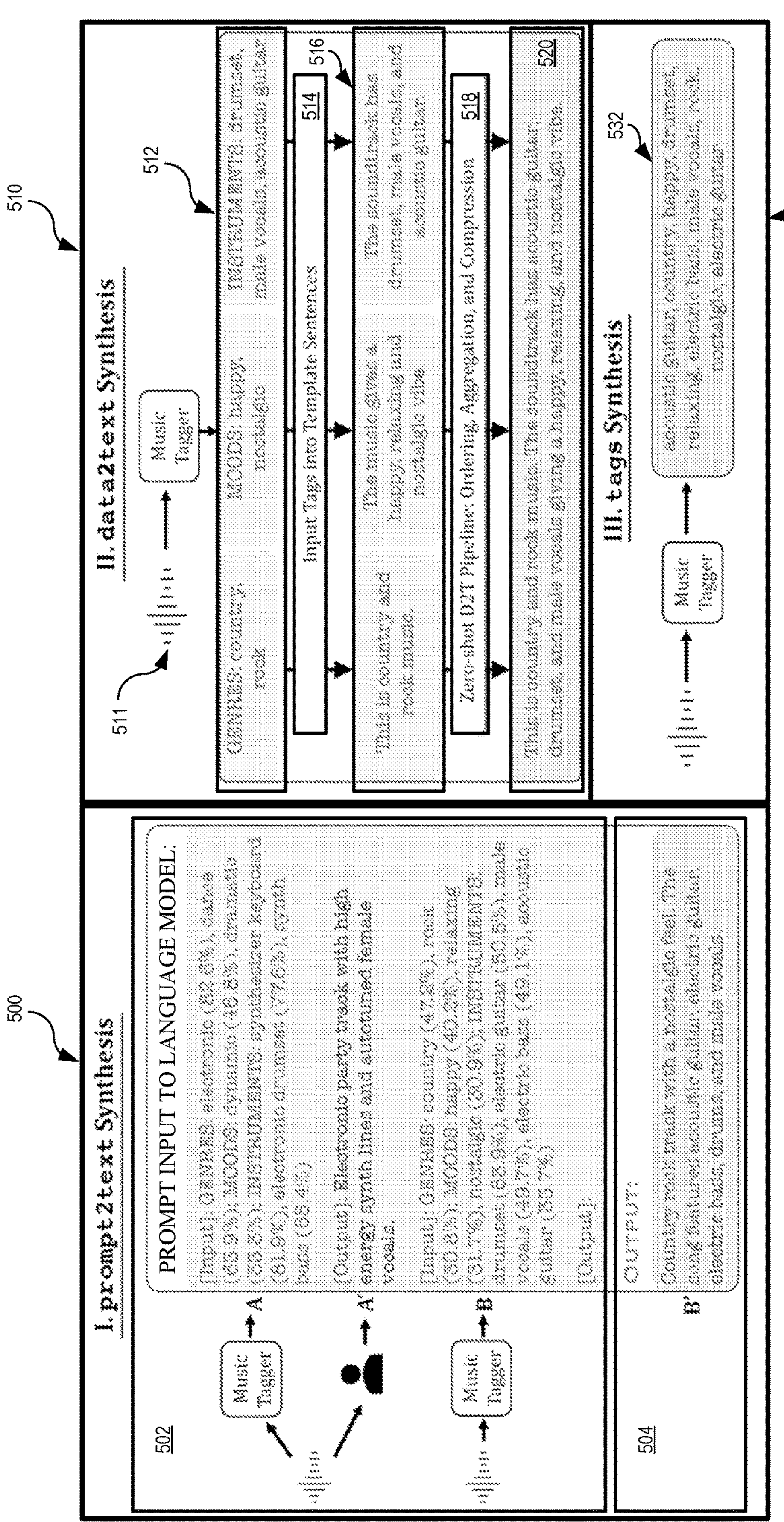
FIG. 5 illustrates exemplary approaches for generating natural language text descriptions of music audio sequences artistically paired with video sequences in accordance with one or more embodiments.

The training natural language text 406 can be textual data describing the music audio sequence in the training media sequence 404. FIG. 5 illustrates exemplary approaches for generating natural language text descriptions of music audio sequences artistically paired with video sequences in accordance with one or more embodiments. In one or more embodiments, the audio recommendation system 102 can generate or receive natural language text descriptions for media sequences generated without human-provided descriptions or annotations for the media sequence. In one or more embodiments, a music tagger trained on a dataset of music tracks manually annotated with a fixed pre-defined vocabulary of tags is used. In one embodiment, the music tagger predicts confidences for 41 instrument tags, 30 genre tags, and 28 mood tags. In one or more embodiments, the music tagger can generate musical tags for each second of a music audio sequence. The predicted musical tags can be aggregated at a clip or segment level (e.g., every ten seconds or 30 seconds) or at a track level. For example, the music tagger generates musical tags for different parts of a music audio sequence as the musical elements of the music changes (e.g., a first set of musical tags for a first portion of the music audio sequence, a second set of musical tags for a second portion of the music audio sequence, etc.). These musical tags can either be aggregated into separate sets for each of the different segments of the music audio sequence or averaged across the entire music audio sequence to produce a single set of musical tags. The set of musical tags can then be filtered based on confidence levels, with only those above a threshold value (e.g., 0.3) kept in the set. Given the set of musical tags with confidences, $d_i \in \mathcal{T}^{\mathcal{D}}$, a generator function, G, synthesizes natural language text descriptions as follows:

$$G:\mathcal{T}^{\mathcal{D}} \rightarrow \mathcal{T}^{T}$$

Which maps structured data (e.g., the musical tags) describing a music audio sequence to the space of natural human descriptions. In one or more embodiments, the goals of mapping function G are that: (i) a predicted output $t_i = G(d_i)$ should preserve the semantic meaning contained within the structured data, $d_i$, corresponding to a specific music audio sequence; and (ii) the distribution of predicted outputs $\tilde{t}_i$ should follow the distribution of ground truth human annotations $\tilde{t}_i \in \mathcal{T}^{T}$. In some embodiments, the musical tags are used in three approaches: a prompt2text approach which relies on careful few-shot prompting of a language model, a zero-shot data2text approach which rephrases templated sentences using pretrained language models, and a zero-shot tags baseline that represents the music track directly via the set of automatically obtained musical tags. In one or more embodiments, the language model is the BigScience Large Open-science Open-access Multilingual (BLOOM-176B) language model.

In one or more embodiments, the few-shot prompt2text approach uses a small set of example human-provided descriptions, $t_i, \ldots, t_N$, where $t_i \sim \mathcal{T}^{T}$. For each example music audio sequence, $t_i$, there is a corresponding structured data output, $d_i$, provided by the automatic music tagger, which describes the same music audio sequence. The structured data output, $d_i$, is converted to text form via a template, and a set of pairs $(d_0, t_0) \ldots (d_k, t_k)$ are used to form k input/output components in the prompt. The final segment of the prompt is the structured data, $d_i$, corresponding to a new music audio sequence. Given $d_i$, the model generates an output description following the mapping $\mathcal{T}^{\mathcal{D}} \rightarrow \mathcal{T}^{T}$ suggested by the example inputs. In one embodiment, for text generation, the BLOOM-176B model is used after being trained on a highly diverse 1.5 TB text corpus. The few-shot prompt2text approach can provide the greatest freedom in generation of the natural language text descriptions of the music audio sequence, which allows the model to generate a diverse set of text resembling the target distribution, $\mathcal{T}^{T}$, more easily. The prompt2text approach is also flexible as large language models, such as BLOOM-176B, can handle a variety of different structured data inputs such as both musical tags and their confidence predictions.

A prompt2text example 500 is shown in FIG. 5. As illustrated in FIG. 5, an input 502 includes a set of musical tags (A) paired with a human-provided description (A') and an unpaired set of musical tags (B) for which a natural language text description is to be generated. The output 504 generated by the prompt2text example 500 is natural language text description (B') generated based on the unpaired set of musical tags (B). In the prompt2text example 500, some or all of the musical tags (B) are used to generate the output 504.

In one or more embodiments, the zero-shot data2text approach uses predefined template sentences to generate natural language text description. In one or more embodiments, this approach inserts structured data output provided by an automatic music tagger into predefined template sentences and rephrases these template sentences using a language model. A set of category-specific templates (e.g., genre, mood, instruments, etc.) in the form of short sentences with placeholders for tags can be defined. An example genre template sentence can be: "This is <genre> music." An example mood template sentence can be: "The music gives a <mood_1> and <mood_2> vibe." An example instrument template sentence can be: "The soundtrack has <instrument_1>, <instrument_2>, and <instrument_3>." The template sentences can be in different formats than the examples described herein. In one or more embodiments, a template sentence is randomly sampled for each category and the placeholder elements are filled with high-confidence predicted musical tags for the corresponding categories. To form the generated sentences into more natural free-form text descriptions, pretrained large language models can be used. In some embodiments, a zero-short data2text approach is used, which includes a pipeline of ordering, aggregation, and compression modules built on pre-trained RoBERTa and BERT language models. The pipeline components first set the order of the individual filled template sentences and assign which template sentences should be combined into a single sentence (e.g., aggregated). Next, the compression module uses a generative text model to rewrite the input sentences based on the ordering and aggregation specifications. The compression module rephrases the information while preserving semantic meaning. Because this data2text pipeline makes use of models that are pre-trained on large, general text corpuses, these modules are able to generate natural language text descriptions of music audio sequences in a zero-shot manner.

A data2text example 510 is shown in FIG. 5. As illustrated in FIG. 5, an input 512 includes a set of musical tags generated by a music tagger for an input music audio sequence 511. The musical tags are then used as inputs for category-specific template sentences 514 to generate filled template sentences 516. The filled template sentences 516 are then passed through a zero-short data2text pipeline 518 to generate a natural language text description 520 of the music audio sequence 511.

In one or more embodiments, the zero-shot tags baseline approach generates a natural language text description by concatenating the musical tags predicted by a music tagger. In one embodiment, the top filtered predicted musical tags for each music audio sequence are randomly shuffled to prevent model dependence on ordering and then concatenated into a comma-separated list of musical descriptions. The zero-shot tags baseline approach example 530 illustrates an example output 532 ("acoustic guitar, country, happy, drum set, relaxing, electric bass, male vocals, rock, nostalgic, electric guitar") generated by concatenating musical tags.

Returning to FIG. 4, the video sequence extracted from the training media sequence 404 and the training natural language text 406 are sent to feature extractors 110, as shown at numeral 3. The music audio sequence extracted from the training media sequence 404 is sent to audio encoder 304, as shown at numeral 4. In one or more embodiments, the feature extractors 110 include an image encoder 112 and a text encoder 116. The image encoder 112 and the text encoder 116 can be configured to extract strong modality-specific base features from the video sequence extracted from the training media sequence 404 and the training natural language text 406, respectively, at numeral 5. In one embodiment, the image encoder 112 extracts visual features 408 for each frame, or segment, of the video sequence, where each frame of the video sequence is represented by separate feature vectors, as described above with respect to FIG. 1. In one embodiment, the text encoder 116 extracts a single set of text features 410 from the training natural language text 406, as described previously with respect to FIG. 1.

In one or more embodiments, the image encoder 112 and the text encoder 116 use the CLIP supervision model. The visual features 408 and the text features 410 can be feature vectors that are n-dimensional vectors of numerical features that represent the video sequence and the training natural language text 406, respectively. After the feature extractors 110 generate the visual features 408 and the text features 410, the visual features 408 and the text features 410 are sent to transformers 120, as shown at numeral 6.

In one or more embodiments, the transformers 120 include transformer encoder neural networks, including a visual transformer 122, a text transformer 126, and an embedding fusion module 130. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the visual transformer 122 generates a visual embedding 412 and text transformer 126 generates a text embedding 414 based on the visual features 408 and text features 410, respectively, at numeral 7, as described previously with respect to FIG. 1.

In one or more embodiments, the difference in granularity between audio/video and text can impact training. In such embodiments, to address the granularity issue, during training a text dropout feature is used where instead of passing the text features 410 to the text transformer 126 for all training natural language text 406, some text features 410 are randomly replaced with a "NULL" value or empty field. In a similar manner to the way dropout prevents overfitting by reducing co-adaptation between individual neurons, text dropout serves to avoid overfitting to the natural language text inputs and prevent co-adaptations between the video and text encoders. In one embodiment, with a probability, p, the text features 410, $x^t$, produced by the pretrained text encoder 116 is set to a specific value $x^{NULL}$. In such situations, the training natural language text 406 is treated as an empty string or a zero vector. In one or more embodiments, treating the text features 410 as a zero vector improves the performance of audio retrieval from text and video together. Further, training with text dropout yields a model which can also perform well at retrieval from the visual embedding 412 generated from a video sequence alone (e.g., as a user may not always provide a natural language text input with a query video sequence at inference) by removing dependence on the natural language text inputs.

The visual embedding 412 and the text embedding 414 are then passed to the embedding fusion module 130 to generate a training fused visual-text embedding 416, at numeral 8. In some embodiments, the embedding fusion module 130 is a two-layer transformer. In one or more embodiments, the embedding fusion module 130, $f^{vt}$, generates the training fused visual-text embedding 416, $y^{vt}=f^{vt}(y^v,y^t)$, by fusing the visual embedding 412 and the text embedding 414 into a single embedding space. After the embedding fusion module 130 generates the training fused visual-text embedding 416, the training fused visual-text embedding 416 is sent to a loss function, as shown at numeral 9.

Returning to the music audio sequence sent to the audio encoder 304, as described above in numeral 4, the audio encoder 304 can be configured to extract strong modality-specific base features from the music audio sequence, at numeral 10. In one embodiment, the audio encoder 304 extracts audio features 418 for each frame, or segment, of the music audio sequence, where each frame of the music audio sequence is represented by separate feature vectors. In one or more embodiments, the audio encoder 304 uses the DeepSim model. The audio features 418 can be feature vectors that are n-dimensional vectors of numerical features that represent the music audio sequence. After the audio encoder 304 generates the audio features 418, the audio features are sent to an audio transformer 308, as shown at numeral 11.

In one or more embodiments, the audio transformer 308 is a transformer encoder neural network. In one or more embodiments, the audio transformer 308 generates an audio embedding 420 using the audio features 418, at numeral 12, as described previously with respect to FIG. 1. In one or more embodiments, the audio embedding 420 is a single embedding generated from the base audio features 418 for a plurality of frames, or segments, of the music audio sequence.

The audio embedding 420 is then passed to the loss function 422, as shown at numeral 13. Using the training fused visual-text embedding 416 and the audio embedding 420, the loss function 422 can calculate a loss, at numeral 14. In one or more embodiments, an InfoNCE loss can be computed as follows:

$$\mathcal{L}_{vt\to m} = -\frac{1}{|\mathcal{D}|}\sum_{i\in\mathcal{D}}\frac{\exp\left(s\left(y_i^{vt},\, y_i^m\right)/\tau\right)}{\sum_{j\in\mathcal{D}}\exp\left(s\left(y_i^{vt},\, y_j^m\right)/\tau\right)}$$

where s is a similarity function, $\mathcal{D}$ is a batch of data, and $\tau$ is a temperature hyperparameter set as $\tau=0.03$. For the similarity metric, a cosine similarity defined as $s(x,y)=x^T y/(\|x\|\cdot\|y\|)$ is used. In one or more embodiments, the loss $\mathcal{L}_{vt\to m}$ is not symmetric as negatives are sampled fsi from music embeddings only. To make the loss symmetric, the summed loss $\mathcal{L}_{m,vt}=\mathcal{L}_{vt\to m}+\mathcal{L}_{m\to vt}$ is used for training.

In one or more embodiments, the loss function 422 can calculate losses between different, or additional, modalities. For example, losses can be calculated between the audio and video embeddings, $\mathcal{L}_{m,v}$, the text and video embeddings, $\mathcal{L}_{t,v}$, and the audio and text embeddings, $\mathcal{L}_{m,t}$. The calculated losses can then be used to train the visual transformer 122, the text transformer 126, and embedding fusion module 130, and the audio transformer 308. In such embodiments, training on these two-modality losses can yield a flexible tri-modal joint embedding space that can easily move between modalities or combinations of modalities. For example, a joint embedding space can allow for additional control over which query input (text or video) to treat as more important when retrieving music audio sequences by using a weighted summation to fuse the two input embeddings. Further, the joint embedding space can simultaneously allow for different retrieval directions such as retrieving a video sequence or natural language text for a music audio sequence query or retrieving a music audio sequence for only a natural language text query.

The calculated loss can then be backpropagated to train the transformers (e.g., visual transformer 122, text transformer 126, embedding fusion module 130, and audio transformer 308), as shown at numeral 15.

In one or more embodiments, to handle music audio recommendation requests that have a temporal aspect (e.g., [“piano solo”, “piano with drums and guitar” ]), the audio recommendation system 102 can be trained on additional, or different, training datasets. In one or more embodiments, the training natural language text 406 accompanying training media sequence 404 can include temporal language describing the characteristics of different parts of the audio sequence in the training media sequence 404. The temporal language for the training media sequence 404 may be manually generated. For example, a user can describe the instrumentation, mood and/or genre of the music audio sequence in the training media sequence 404 at different points of the audio sequence. In one or more embodiments, a music tagger can compute music tags for each segment of a music audio sequence in the training media sequence 404. Further, the audio transformer 308 can be trained to encode the temporal locations in the audio sequence via positional encodings.

Figure 6:
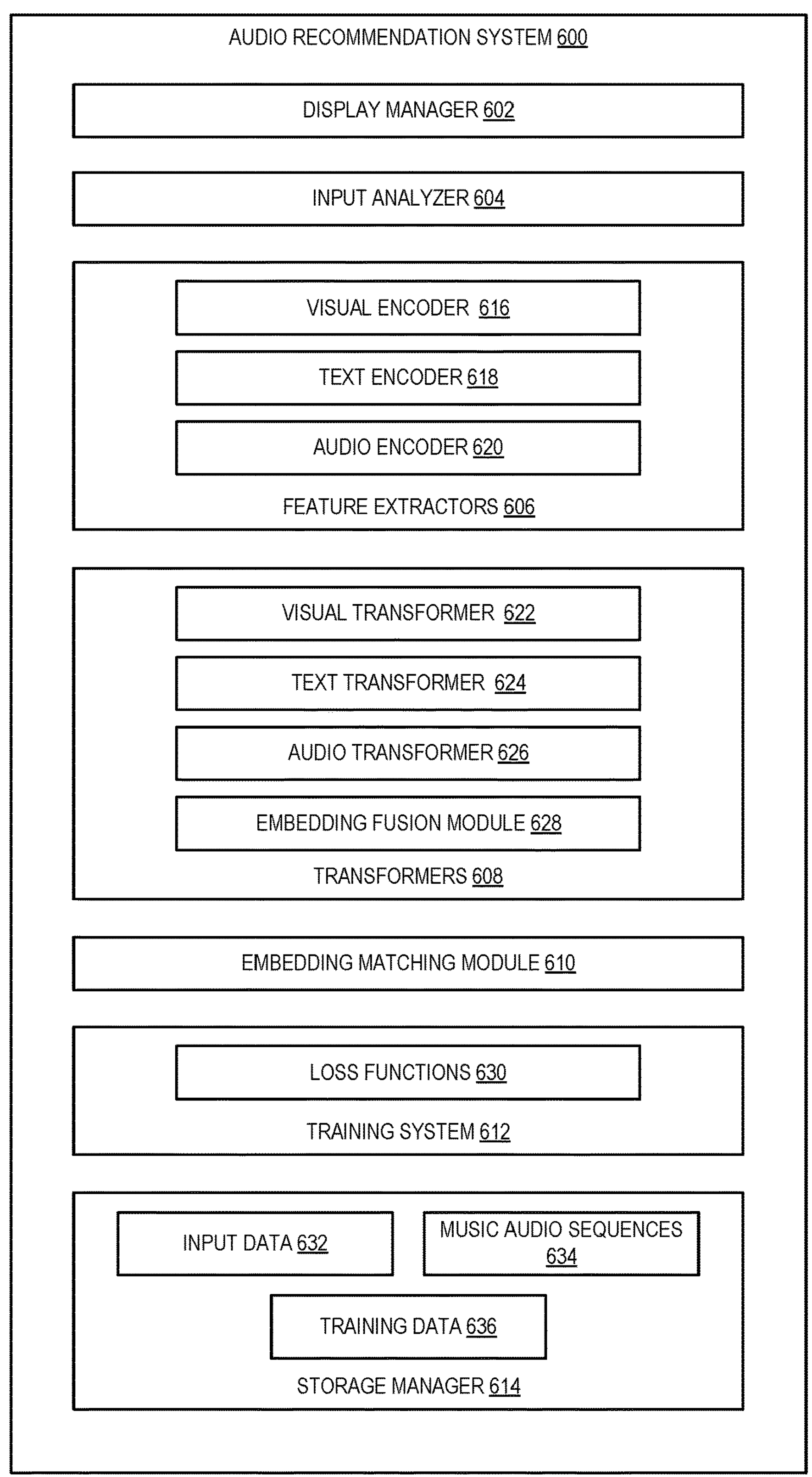
FIG. 6 illustrates a schematic diagram of an audio recommendation system in accordance with one or more embodiments.

FIG. 6 illustrates a schematic diagram of an audio recommendation system (e.g., “audio recommendation system” described above) in accordance with one or more embodiments. As shown, the audio recommendation system 600 may include, but is not limited to, a display manager 602, an input analyzer 604, feature extractors 606, transformers 608, an embedding matching module 610, a training system 612, and a storage manager 614. As shown, the feature extractors 606 include a visual encoder 616, a text encoder 618, and an audio encoder 620. The transformers 608 include a visual transformer 622, a text transformer 624, an audio transformer 626, and an embedding fusion module 628. The training system 612 includes loss functions 630. The storage manager 614 includes input data 632, a music audio sequences database 634, and training data 636.

As illustrated in FIG. 6, the audio recommendation system 600 includes a display manager 602. In one or more embodiments, the display manager 602 identifies, provides, manages, and/or controls a user interface provided on a touch screen or other device. Examples of displays include interactive whiteboards, graphical user interfaces (or simply “user interfaces”) that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the audio recommendation system 600 also includes an input analyzer 604. The input analyzer 604 analyzes an input received by the audio recommendation system 600 to identify media sequences, music audio sequences, video sequences, and natural language text. In one or more embodiments, the input analyzer 604 can extract a music audio sequence and a video sequences from a media sequence (e.g., a music video).

As further illustrated in FIG. 6, the audio recommendation system 600 also includes feature extractors 606 configured to extract features, or feature vectors, from an input. For example, a visual encoder 616 extracts visual features from an input video sequence, a text encoder 618 extracts text features from input natural language text, and audio encoder 620 extracts audio features from an input music audio sequence. In one or more embodiments, the embeddings generated by the visual encoder 616, text encoder 618, and audio encoder 620 are feature vectors that are n-dimensional vectors of numerical features that represent the input. In one or more embodiments, the feature vectors are 256-dimensional feature vectors. The encoder may include neural networks. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 6, the audio recommendation system 600 also includes transformers 608 configured to generate embeddings for video sequences, music audio sequences, and natural language text based on visual feature, audio features, and text features, respectively. The transformers 608 can be implemented as, or include, one or more machine learning models, such as a neural network or a deep learning model. In one embodiment, the transformers 608 are transformer encoder networks. The transformers 608 can include a visual transformer 622 configured to generate visual embeddings from visual features, a text transformer 624 configured to generate text embeddings from text features, and audio transformer 626 configured to generate audio embeddings from audio feature. The transformers 608 can also include an embedding fusion module 628 configured to generate a fused visual-text embedding by fusing the visual embedding and the text embedding into a single embedding space. In one or more embodiments, the embedding fusion module 628 is a two-layer transformer. In one or more embodiments, the transformers 608 encode feature vectors into embeddings of size d=256.

As further illustrated in FIG. 6, the audio recommendation system 600 also includes an embedding matching module 610 configured to compare fused visual-text embeddings and audio embeddings from a music audio sequences database 634 to identify music audio sequences from the music audio sequences database 634 that best match an input video sequence and natural language text input. In one or more embodiments, the embedding matching module 610 can then rank the music audio sequences based on calculating a similarity value or metric between the fused visual-text embeddings and audio embeddings from a music audio sequences database 634. In such embodiments, the embedding matching module 610 selects the music audio sequence that has the highest similarity as a music audio sequence recommendation.

As further illustrated in FIG. 6, the audio recommendation system 600 includes training system 612 which is configured to teach, guide, tune, and/or train one or more neural networks. In particular, the training system 612 trains audio transformer 626 and embedding fusion module 628 using loss function 630, based on training data.

As further illustrated in FIG. 6, the storage manager 614 includes input data 632, music audio sequences database 634, and training data 636. In particular, the input data 632 may include an input video sequences and natural language text inputs received by the audio recommendation system 600. The music audio sequences database 634 may include music audio sequences and audio embeddings generated for each music audio sequence that may be used by the audio recommendation system 600 to identify music audio sequences to recommend based on an input video sequence and natural language text input. In one or more embodiments, the training data 636 may include media, music audio, and video sequences and natural language text inputs that can be used during a training process of the audio recommendation system 600 to train one or more neural networks.

Each of the components 602-614 of the audio recommendation system 600 and their corresponding elements (as shown in FIG. 6) may be in communication with one another using any suitable communication technologies. It will be recognized that although components 602-614 and their corresponding elements are shown to be separate in FIG. 6, any of components 602-614 and their corresponding elements may be combined into fewer components, such as into a single facility or module, divided into more components, or configured into different components as may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the audio recommendation system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the audio recommendation system 600 may, for example, be implemented as one or more stand-alone applications, as one or more modules of an application, as one or more plug-ins, as one or more library functions or functions that may be called by other applications, and/or as a cloud-computing model. Thus, the components 602-614 of the audio recommendation system 600 may be implemented as a stand-alone application, such as a desktop or mobile application. Furthermore, the components 602-614 of the audio recommendation system 600 may be implemented as one or more web-based applications hosted on a remote server. Alternatively, or additionally, the components of the audio recommendation system 600 may be implemented in a suit of mobile device applications or "apps."

FIGS. 1-6, the corresponding text, and the examples, provide a number of different systems and devices that train transformers of an audio recommendation system to generate embeddings for audio, video, and text used to generate audio recommendations. In addition to the foregoing, embodiments can also be described in terms of flowcharts comprising acts and steps in a method for accomplishing a particular result. For example, FIGS. 7-9 illustrate flowcharts of exemplary methods in accordance with one or more embodiments. The methods described in relation to FIGS. 7-9 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of generating a music audio sequence recommendation for pairing with a query video sequence based on the query video sequence and natural language text inputs using a trained audio recommendation system in accordance with one or more embodiments. In one or more embodiments, the method 700 is performed in a digital medium environment that includes the audio recommendation system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving an input, the input including a query video sequence and natural language text, the natural language text including parameters for a recommended music audio sequence for pairing with the query video sequence. In one or more embodiments, the query video sequence is a video sequence for which a user is requesting a music audio sequence recommendation for pairing with the query video sequence. In one or more embodiments, the natural language text is an input indicating parameters for guiding the music audio sequence recommendation to be generated by the audio recommendation system. In one or more embodiments, the parameters in the natural language text can indicate a genre, a mood, and/or instrumentation of music. In some embodiments, the natural language text includes first parameters for a first portion of the recommended music audio sequence for pairing with the query video sequence and second parameters for a second portion of the recommended music audio sequence for pairing with the query video sequence.

In one or more embodiments, the audio recommendation system receives the query video sequence and natural language text from a user (e.g., via a computing device). In one or more embodiments, the user may select the query video sequence and provide the natural language text in an application, or the user may submit the query video sequence and natural language text to a web service or an application configured to receive inputs. The query video sequence can also be a portion selected from a longer video sequence. For example, after providing the video sequence to the application, the application can provide an interface to enable the user to select a portion of the longer video sequence.

As shown in FIG. 7, the method 700 also includes an act 704 of generating a fused visual-text embedding based on a visual embedding corresponding to the query video sequence and a text embedding corresponding to the natural language text. In one embodiment, an image encoder extracts visual features for each frame, or segment, of the query video sequence, where each frame of the query video sequence is represented by separate feature vectors. In one embodiment, a text encoder extracts a set of text features from the natural language text. In one or more embodiments, the image encoder and the text encoder use the CLIP supervision model. The visual features and the text features can be feature vectors that are n-dimensional vectors of numerical features that represent the query video sequence and the natural language text, respectively. The visual features and the text features are then sent to transformer encoder neural networks. In one or more embodiments, a visual transformer generates a visual embedding and a text transformer generates a text embedding. In one or more embodiments, the visual transformer generates the visual embedding for the query video sequence based on the visual features. In one or more embodiments, the visual embedding is a single embedding generated from the visual features for a plurality of frames, or segments, of the query video sequence. In one or more embodiments, the text transformer generates the text embedding for the natural language text based on the text features. In one or more embodiments, the visual embedding and text embedding are encoded into embeddings of size d=256. The visual embedding and the text embedding are then passed to the embedding fusion module to generate a fused visual-text embedding. In some embodiments, the embedding fusion module is a two-layer transformer. In one or more embodiments, the embedding fusion module generates the fused visual-text embedding by fusing the visual embedding and the text embedding into a single embedding space. In one or more embodiments, the fused visual-text embedding is encoded into embeddings of size d=256.

As shown in FIG. 7, the method 700 also includes an act 706 of comparing audio embeddings for music audio sequences of a music audio sequences database with the fused visual-text embedding. In one or more embodiments, an embedding matching module can access a music audio sequences database to retrieve music audio sequences. In one or more embodiments, the music audio sequences in the music audio sequences database have been pre-processed through an audio encoder and an audio transformer in a process similar to the process described for the query video sequence to generate audio embeddings for each of the music audio sequences. In such embodiments, retrieving the music audio sequences from the music audio sequences database includes retrieving associated audio embeddings. The embedding matching module determines the similarity between the fused visual-text embedding and the audio embeddings from the music audio sequences database by comparing the embeddings.

As shown in FIG. 7, the method 700 also includes an act 708 of determining a first music audio sequence from the music audio sequences database as the recommended music audio sequence for pairing with the query video sequence based on a similarity metric calculated between a first audio embedding for the first music audio sequence and fused visual-text embedding being above a threshold value. The embedding matching module identifies or determines the first music audio sequence whose corresponding audio embedding best matches the fused visual-text embedding. The embedding matching module can determine the music audio sequence by comparing the fused visual-text embedding to the audio embeddings from the music audio sequences database. In one or more embodiments, the embedding matching module can identify multiple music audio sequences. In such embodiments, the embedding matching module can rank the music audio sequences based on similarity values or metrics. The music audio sequence can be the highest ranking music audio sequence from the ranking or the top x music audio sequences from the ranking.

After the embedding matching module identifies the first music audio sequence, the first music audio sequence can be sent as an output. In some embodiments, the output can include one or more music audio sequences. In one or more embodiments, the output is sent through a communications channel to the user device or computing device that provided the input requesting the music audio sequence recommendation, to another computing device associated with the user or another user, or to another system or application.

FIG. 8 illustrates a flowchart of a series of acts in a method of training neural network models of an audio recommendation system to generate music audio sequence recommendations using an input video sequence and a natural language text input in accordance with one or more embodiments. In one or more embodiments, the method 800 is performed in a digital medium environment that includes the audio recommendation system 600. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving a training input, the training input including a training media sequence and training natural language text, wherein the training media sequence is a pairing of a training music audio sequence and a training video sequence, and wherein the training natural language text describes the training music audio sequence. In one or more embodiments, the training media sequence is an artistic pairing of a music audio sequence and a video sequence (e.g., a music video). In some embodiments, the training input is used to train neural networks of the audio recommendation system to generate audio recommendations for video sequences. In one or more embodiments, the audio recommendation system receives the training media sequence and the training natural language text from a user (e.g., via a computing device). In one or more embodiments, the user may select the training media sequence and the training natural language text in an application, or the user may submit the training media sequence and the training natural language text a web service or an application configured to receive inputs.

As shown in FIG. 8, the method 800 also includes an act 804 of generating, by an embedding fusion module, a training fused visual-text embedding based on a training visual embedding corresponding to the training video sequence and a training text embedding corresponding to the training natural language text. In one or more embodiments, the audio recommendation system can extract the training video sequence and the training music audio sequence from the training media sequence. In other embodiment, the training video sequence and the training music audio sequence can be extracted from the training media sequence prior to being provided to the audio recommendation system. In one embodiment, an image encoder extracts visual features for each frame, or segment, of the training video sequence, where each frame of the training video sequence is represented by separate feature vectors. In one embodiment, a text encoder extracts a set of text features from the training natural language text. In one or more embodiments, the image encoder and the text encoder use the CLIP supervision model. The visual features and the text features can be feature vectors that are n-dimensional vectors of numerical features that represent the training video sequence and the training natural language text, respectively. The visual features and the text features are then sent to transformer encoder neural networks. In one or more embodiments, a visual transformer generates a visual embedding and a text transformer generates a text embedding. In one or more embodiments, the visual transformer generates the visual embedding for the training video sequence based on the visual features. In one or more embodiments, the visual embedding is a single embedding generated from the visual features for a plurality of frames, or segments, of the training video sequence. In one or more embodiments, the text transformer generates the text embedding for the training natural language text based on the text features. In one or more embodiments, the visual embedding and text embedding are encoded into embeddings of size d=256. The visual embedding and the text embedding are then passed to the embedding fusion module to generate a training fused visual-text embedding. In some embodiments, the embedding fusion module is a two-layer transformer. In one or more embodiments, the embedding fusion module generates the training fused visual-text embedding by fusing the visual embedding and the text embedding into a single embedding space. In one or more embodiments, the fused visual-text embedding is encoded into embeddings of size d=256. The training fused visual-text embedding is then passed to a loss function.

As shown in FIG. 8, the method 800 also includes an act 806 of generating a training audio embedding for the training music audio sequence. In one or more embodiments, an audio encoder extracts audio features for each frame, or segment, of the training music audio sequence, where each frame of the training music audio sequence is represented by separate feature vectors. In one or more embodiments, the audio encoder uses the DeepSim model. The audio features can be feature vectors that are n-dimensional vectors of numerical features that represent the training music audio sequence. After the audio encoder generates the audio features 418, the audio features are sent to an audio transformer 308. In one or more embodiments, the audio transformer is a transformer encoder neural network. In one or more embodiments, the audio transformer generates an audio embedding using the audio features. In one or more embodiments, the audio embedding is a single embedding generated from the base audio features for a plurality of frames, or segments, of the training music audio sequence.

As shown in FIG. 8, the method 800 also includes an act 808 of training the embedding fusion module based on calculating a loss using the training fused visual-text embedding and the training audio embedding. In one or more embodiments, audio embedding is then passed to the loss function. Using the training fused visual-text embedding and the audio embedding, the loss function can calculate a loss. In one or more embodiments, an InfoNCE loss can be computed as follows:

$$\mathcal{L}_{vt\to m} = -\frac{1}{|\mathcal{D}|}\sum_{i\in\mathcal{D}}\frac{\exp\left(s\left(y_i^{vt}, y_i^{m}\right)/\tau\right)}{\sum_{j\in\mathcal{D}}\exp\left(s\left(y_i^{vt}, y_j^{m}\right)/\tau\right)}$$

where s is a similarity function, $\mathcal{D}$ is a batch of data, and τ is a temperature hyperparameter set as τ=0.03. For the similarity metric, a cosine similarity defined as $s(x,y)=x^T y/(\|x\|\cdot\|y\|)$ is used. In one or more embodiments, the loss $\mathcal{L}_{vt\to m}$ is not symmetric as negatives are sampled from music embeddings only. To make the loss symmetric, the summed loss $\mathcal{L}_{m,vt}=\mathcal{L}_{vt\to m}+\mathcal{L}_{m\to vt}$ is used for training. The calculated loss can then be backpropagated to train the embedding fusion module and the audio transformer.

FIG. 8 illustrates a flowchart of a series of acts in a method of generating a music audio sequence recommendation for pairing with a query video sequence based on the query video sequence and natural language text inputs using a trained audio recommendation system in accordance with one or more embodiments. In one or more embodiments, the method 900 is performed in a digital medium environment that includes the audio recommendation system 600. The method 900 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 900 includes an act 902 of receiving an input, the input including a query video sequence and natural language text, the natural language text including parameters for a recommended music audio sequence for pairing with the query video sequence. In one or more embodiments, the query video sequence is a video sequence for which a user is requesting a music audio sequence recommendation for pairing with the query video sequence. In one or more embodiments, the natural language text is an input indicating parameters for guiding the music audio sequence recommendation to be generated by the audio recommendation system. In one or more embodiments, the parameters in the natural language text can indicate a genre, a mood, and/or instrumentation of music. In some embodiments, the natural language text includes first parameters for a first portion of the recommended music audio sequence for pairing with the query video sequence and second parameters for a second portion of the recommended music audio sequence for pairing with the query video sequence.

In one or more embodiments, the audio recommendation system receives the query video sequence and natural language text from a user (e.g., via a computing device). In one or more embodiments, the user may select the query video sequence and provide the natural language text in an application, or the user may submit the query video sequence and natural language text to a web service or an application configured to receive inputs. The query video sequence can also be a portion selected from a longer video sequence. For example, after providing the video sequence to the application, the application can provide an interface to enable the user to select a portion of the longer video sequence.

As shown in FIG. 8, the method 900 also includes an act 904 of determining a first music audio sequence from the music audio sequence database as the recommended music audio sequence for pairing with the query video sequence based on a similarity metric calculated between a first audio embedding for the first music audio sequence and a fused visual-text embedding generated from the query video sequence and the natural language text being above a threshold value. In one embodiment, an image encoder extracts visual features for each frame, or segment, of the query video sequence, where each frame of the query video sequence is represented by separate feature vectors. In one embodiment, a text encoder extracts a set of text features from the natural language text. In one or more embodiments, the image encoder and the text encoder use the CLIP supervision model. The visual features and the text features can be feature vectors that are n-dimensional vectors of numerical features that represent the query video sequence and the natural language text, respectively. The visual features and the text features are then sent to transformer encoder neural networks. In one or more embodiments, a visual transformer generates a visual embedding and a text transformer generates a text embedding. In one or more embodiments, the visual transformer generates the visual embedding for the query video sequence based on the visual features. In one or more embodiments, the visual embedding is a single embedding generated from the visual features for a plurality of frames, or segments, of the query video sequence. In one or more embodiments, the text transformer generates the text embedding for the natural language text based on the text features. In one or more embodiments, the visual embedding and text embedding are encoded into embeddings of size d=256. The visual embedding and the text embedding are then passed to the embedding fusion module to generate a fused visual-text embedding. In some embodiments, the embedding fusion module is a two-layer transformer. In one or more embodiments, the embedding fusion module generates the fused visual-text embedding by fusing the visual embedding and the text embedding into a single embedding space. In one or more embodiments, the fused visual-text embedding is encoded into embeddings of size d=256.

As shown in FIG. 8, the method 900 also includes an act 906 of comparing audio embeddings for music audio sequences of a music audio sequences database with the fused visual-text embedding. In one or more embodiments, an embedding matching module can access a music audio sequences database to retrieve music audio sequences. In one or more embodiments, the music audio sequences in the music audio sequences database have been pre-processed through an audio encoder and an audio transformer in a process similar to the process described for the query video sequence to generate audio embeddings for each of the music audio sequences. In such embodiments, retrieving the music audio sequences from the music audio sequences database includes retrieving associated audio embeddings. The embedding matching module determines the similarity between the fused visual-text embedding and the audio embeddings from the music audio sequences database by comparing the embeddings.

The embedding matching module identifies or determines a first music audio sequence whose corresponding audio embedding best matches the fused visual-text embedding. The embedding matching module can determine the first music audio sequence by comparing the fused visual-text embedding to the audio embeddings from the music audio sequences database. In one or more embodiments, the embedding matching module can identify multiple music audio sequences. In such embodiments, the embedding matching module can rank the music audio sequences based on similarity values or metrics. The music audio sequence can be the highest ranking music audio sequence from the ranking or the top x music audio sequences from the ranking.

As shown in FIG. 8, the method 900 also includes an act 906 of outputting a media sequence, wherein the media sequence is a combination of the query video sequence and the first music audio sequence. After the embedding matching module identifies the first music audio sequence, the first music audio sequence can be sent as an output. In one or more embodiments, the output can be a media sequence generated by combining or syncing the first music audio sequence to the query video sequence. In some embodiments, the output can include multiple music audio sequences. In such embodiments, the multiple music audio sequences can be ranked or ordered based on their similarity metrics with the fused visual-text embedding. In one or more embodiments, the output is sent through a communications channel to the user device or computing device that provided the input requesting the music audio sequence recommendation, to another computing device associated with the user or another user, or to another system or application.

Figure 10:
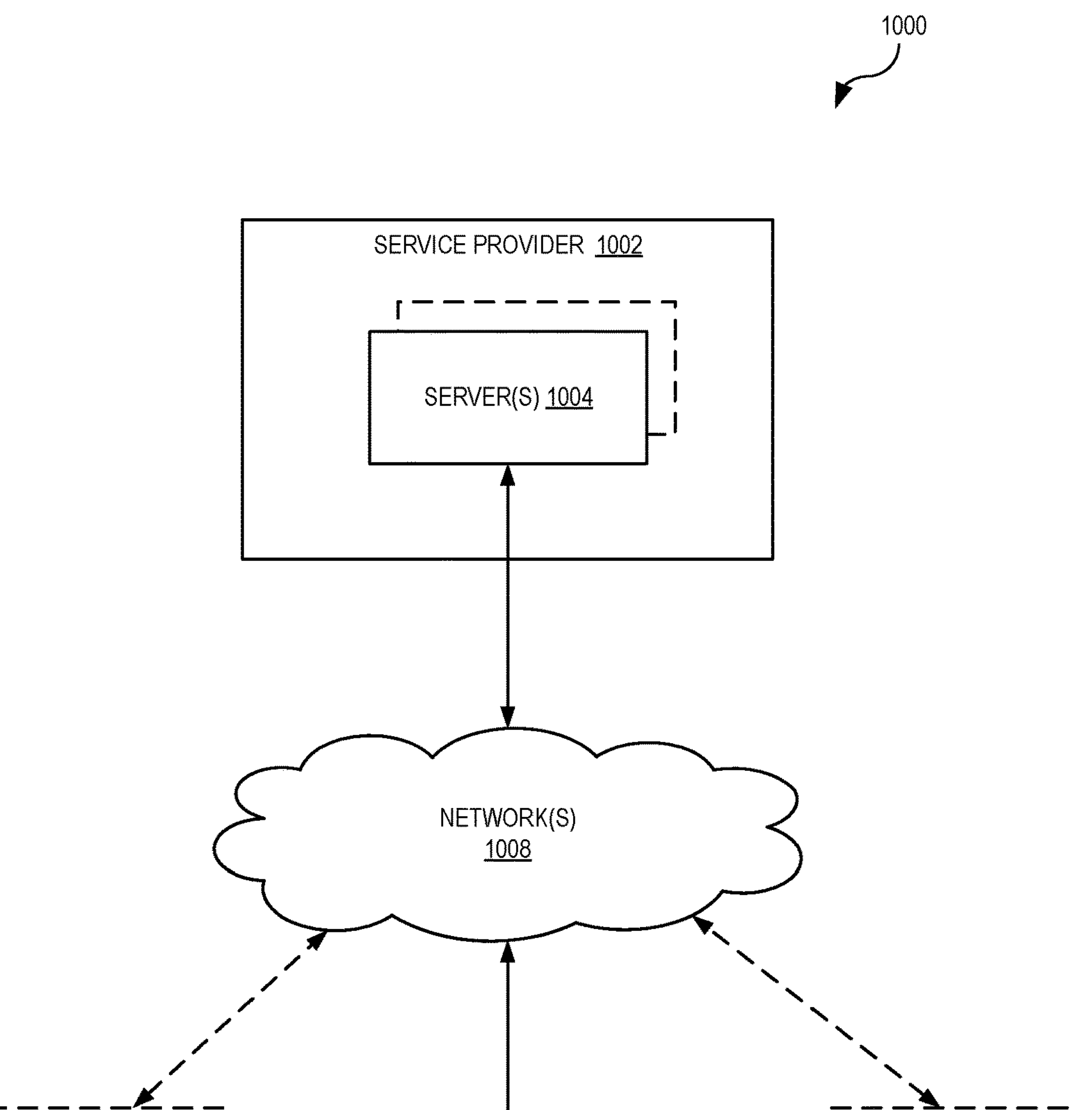
FIG. 10 illustrates a schematic diagram of an exemplary environment in which the audio recommendation system can operate in accordance with one or more embodiments.

FIG. 10 illustrates a schematic diagram of an exemplary environment 1000 in which the audio recommendation system 600 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the audio recommendation system 600. In particular, the audio recommendation system 600 may be implemented in whole or in part on the client device 1006A. Alternatively, in some embodiments, the environment 1000 is implemented in a distributed architecture across multiple computing devices.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access the service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including input data 632, music audio sequences database 634, and training data 636 or other information. For example, a server 1004 may receive data from a client device, such as the client device 1006A, and send the data to another client device, such as the client device 1006B and/or 1006N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the audio recommendation system 600. In particular, the audio recommendation system 600 can comprise an application running on the one or more servers 1004 or a portion of the audio recommendation system 600 can be downloaded from the one or more servers 1004. For example, the audio recommendation system 600 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide a user of the client device 1006A with an interface to provide inputs, including training media sequences and training natural language text. Upon receiving the inputs, the one or more servers 1004 can automatically perform the methods and processes described above to train an audio recommendation system to produce a music audio sequence recommendation in response to receiving a video sequence and natural language text indication parameters for the music audio sequence recommendation.

As just described, the audio recommendation system 600 may be implemented in whole, or in part, by the individual elements 1002-1008 of the environment 1000. It will be appreciated that although certain components of the audio recommendation system 600 are described in the previous examples with regard to particular elements of the environment 1000, various alternative implementations are possible. For instance, in one or more embodiments, the audio recommendation system 600 is implemented on any of the client devices 1006A-1006N. Similarly, in one or more embodiments, the audio recommendation system 600 may be implemented on the one or more servers 1004. Moreover, different components and functions of the audio recommendation system 600 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory computer-readable storage media which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
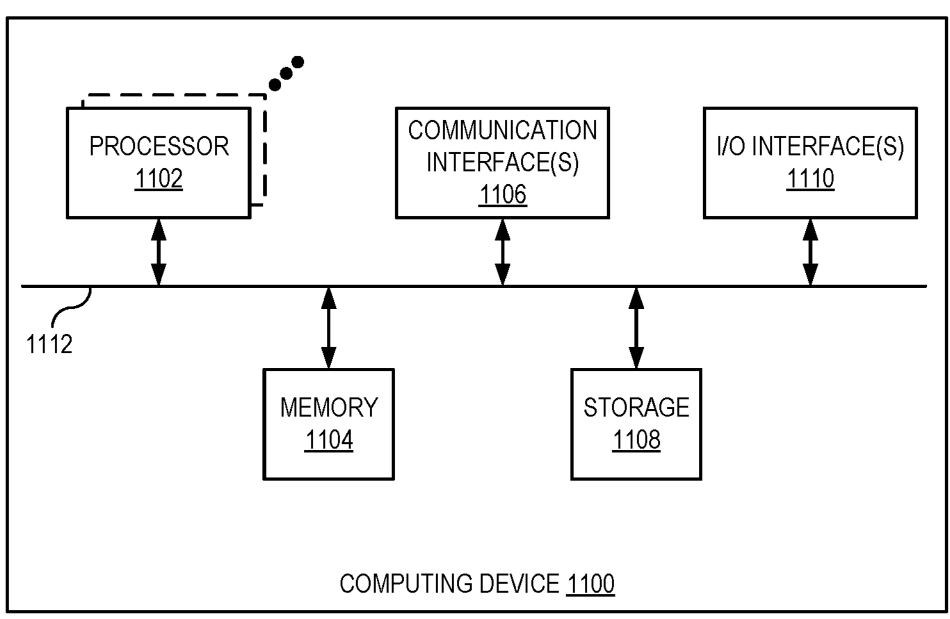
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the audio recommendation system 600. As shown by FIG. 11, the computing device can comprise a processor 1102, memory 1104, one or more communication interfaces 1106, a storage device 1108, and one or more input or output ("I/O") devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more I/O devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:

receiving an input, the input including a query video sequence and natural language text, the natural language text including multiple parameters for different portions of a recommended music audio sequence for pairing with the query video sequence, the parameters including a description of one or more of: a mood, a genre, and instrumentation;

concatenating a visual embedding corresponding to the query video sequence and a text embedding corresponding to the natural language text to generate a concatenated embedding;

generating a fused visual-text embedding by processing the concatenated embedding through a transformer-based model;

comparing audio embeddings for music audio sequences of a music audio sequences database with the fused visual-text embedding;

determining a first music audio sequence from the music audio sequences database as the recommended music audio sequence for pairing with the query video sequence based on a similarity metric calculated between a first audio embedding for the first music audio sequence and the fused visual-text embedding being above a threshold value; and outputting a media sequence, wherein the media sequence is a combination of the query video sequence and the first music audio sequence.

2. The computer-implemented method of claim 1, further comprising:

generating the visual embedding for the query video sequence by:

extracting, for each frame of the query video sequence, base visual features, and generating, by a visual transformer, the visual embedding for the query video sequence using the extracted base visual features.

3. The computer-implemented method of claim 1, further comprising:

generating the text embedding for the natural language text further by:

extracting base text features from the natural language text, and generating, by a text transformer, the text embedding for the natural language text using the extracted base text features.

4. The computer-implemented method of claim 1, further comprising:

for each music audio sequence in the music audio sequences database:

extracting, for each frame of a music audio sequence, base audio features, generating, by an audio transformer, an audio embedding for the music audio sequence using the extracted base audio features, and storing the audio embedding in the music audio sequences database.

5. The computer-implemented method of claim 1, wherein the natural language text includes first parameters for a first portion of the recommended music audio sequence for pairing with the query video sequence and second parameters for a second portion of the recommended music audio sequence for pairing with the query video sequence.

6. A non-transitory computer-readable storage medium storing executable instructions, which when executed by a processing device, cause the processing device to perform operations comprising:

receiving an input, the input including a query video sequence and natural language text, the natural language text including multiple parameters for different portions of a recommended music audio sequence for pairing with the query video sequence, the parameters including a description of one or more of: a mood, a genre, and instrumentation;

concatenating a visual embedding corresponding to the query video sequence and a text embedding corresponding to the natural language text to generate a concatenated embedding;

generating a fused visual-text embedding by processing the concatenated embedding through a transformer-based model;

determining a first music audio sequence from a music audio sequence database as the recommended music audio sequence for pairing with the query video sequence based on a similarity metric calculated between a first audio embedding for the first music audio sequence and the fused visual-text embedding generated from the query video sequence and the natural language text being above a threshold value; and outputting a media sequence, wherein the media sequence is a combination of the query video sequence and the first music audio sequence.

7. The non-transitory computer-readable storage medium of claim 6, wherein the instructions further cause the processing device to perform operations comprising:

generating a visual embedding for the query video sequence by:

extracting, for each frame of the query video sequence, base visual features, and generating, by a visual transformer, the visual embedding for the query video sequence using the extracted base visual features;

generating a text embedding for the natural language text further by:

extracting base text features from the natural language text, and generating, by a text transformer, the text embedding for the natural language text using the extracted base text features; and generating, by a transformer, the fused visual-text embedding using the visual embedding and the text embedding.

8. The non-transitory computer-readable storage medium of claim 6, wherein the instructions further cause the processing device to perform operations comprising:

for each music audio sequence in the music audio sequences database:

extracting, for each frame of a music audio sequence, base audio features, and generating, by an audio transformer, an audio embedding for the music audio sequence using the extracted base audio features.

9. The non-transitory computer-readable storage medium of claim 6, wherein the natural language text includes first parameters for a first portion of the recommended music audio sequence for pairing with the query video sequence and second parameters for a second portion of the recommended music audio sequence for pairing with the query video sequence.

* * * * *